(No Model.)

J. N. PARKER.
PRUNING IMPLEMENT.

No. 377,956. Patented Feb. 14, 1888.

Witnesses:
David S. Williams.
Hamilton D. Turner

Inventor:
Joseph N. Parker
by his Attorneys
Howson & Sons

UNITED STATES PATENT OFFICE.

JOSEPH N. PARKER, OF VINELAND, NEW JERSEY.

PRUNING IMPLEMENT.

SPECIFICATION forming part of Letters Patent No. 377,956, dated February 14, 1888.

Application filed February 14, 1887. Serial No. 227,498. (No model.)

*To all whom it may concern:*

Be it known that I, JOSEPH N. PARKER, a citizen of the United States, and a resident of Vineland, Cumberland county, New Jersey, have invented certain Improvements in Pruning and Cutting Knives, of which the following is a specification.

The object of my invention is to construct a pruning, clipping, and weeding knife which, while efficient for the ordinary uses of such an implement, is especially valuable for cutting old stalks or canes of berry-bushes and like growths, the latter operation being effected without risk of pulling the stalks or canes from the ground.

Figure 1:
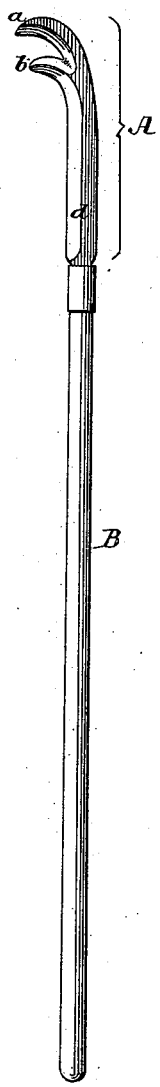
Figure 2:
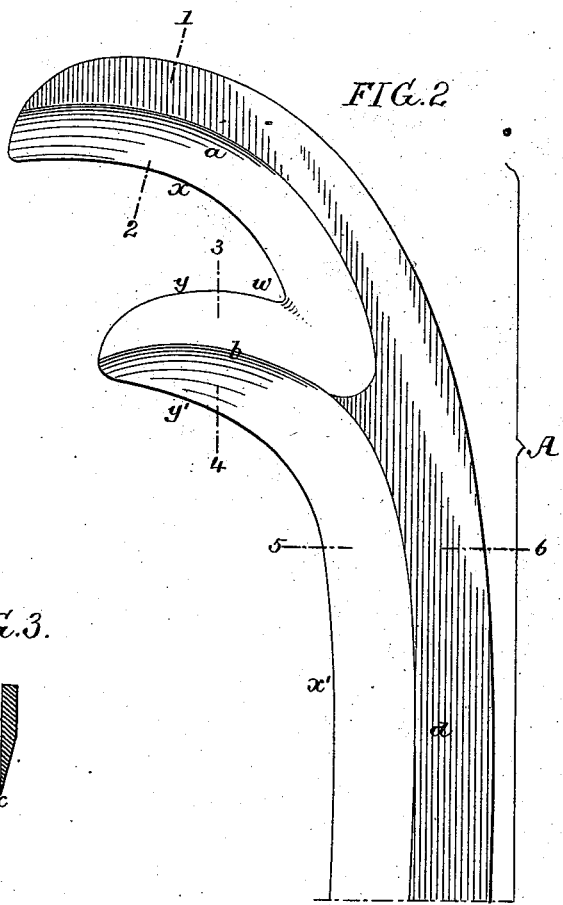

In the accompanying drawings, Figure 1 is a side view of the improved implement; Fig. 2, an enlarged view of the cutting portion of the implement; and Figs. 3, 4, and 5, transverse sections, respectively, on the lines 1 2, 3 4, and 5 6, Fig. 2.

A is the blade of the knife, provided with a handle, B, which should be of such length that the knife is available for use in trimming the limbs of dwarf trees or the lower limbs of trees of higher growth, and can also be used for trimming close to the ground without requiring the operator to stoop or assume a strained or uncomfortable position.

Figure 3:
Figure 5:

The blade is curved or bent at the upper end, so as to form the pruning-hook $a$, the back of the blade being blunt, and the blade being beveled on the front of the straight shank $d$ and on the inner edge of the hook $a$, so as to form cutting-edges $x\ x'$, as shown in Figs. 3 and 5.

Figure 4:

From the front of the blade, just below the hook $a$, projects a finger, $b$, which is beveled from its center in both directions, as shown in Fig. 4, so as to form two cutting-edges, $y\ y'$, the outer edge, $y$, forming, with the inner edge, $x$, of the hook $a$, a tapering V-shaped throat, $w$, while the inner edge, $y'$, of the finger merges gently into the cutting-edge $x'$ on the front of the straight shank $d$ of the blade.

The cutting-edges $x\ x'$ are available for pruning, cutting, and trimming purposes, and the inner edge, $y'$, of the finger $b$ serves as an additional hook for use in the same manner as the hook $a$; but it is the outer edge, $y$, of said finger which is of the most importance in the use of the implement, for while the operation of cutting by the hooked portion of the implement is effected by drawing the blade toward the user, the outer edge of the finger is caused to cut by a pushing action of the blade. This is of especial importance in trimming such growths as berry-bushes, from which each season the canes or stalks of the preceding season must be removed. The old canes are cut off close to the ground, and as they are generally of considerable size it frequently happens that when they are cut by an upward pull—such as that necessary when a pruning-hook is used—the canes, with their roots, are pulled from the ground; hence pruning-shears are now largely employed in performing this work, although trimming with the shears is both slow and inconvenient.

As by the use of my improved implement the cutting of the canes can be effected by a downward thrust, there is no risk of uprooting the canes, and the trimming operation can be performed with rapidity and efficiency, the hook $a$ serving to separate the canes, so as to single them out for the cutting action of the finger $b$, and said hook being available as a means of withdrawing the canes and throwing them to one side after they have been cut.

It will be observed by reference to Figs. 3, 4, and 5 that the under side of the cutting-blade and its finger is flat, all of the bevel which forms the cutting-edges $x\ x'\ y\ y'$ being on the upper side of the blade. By this means the implement is rendered available for slicing or paring limbs, boughs, or stalks, as well as for trimming or cutting them sharply across.

The tapering throat $w$, formed by the hook $a$ and finger $b$ of the implement, can, owing to its wedge form, be caused to engage with stems, stalks, brush, briers, &c.; and this throat thus provides a ready means of removing matters of this character, whatever their size may be, whereas an ordinary pruning-hook is ineffective in dealing with such obstructions, and the removal of the latter by hand is necessary when such hook is used.

Having thus described my invention, what I claim, and desire to secure by Letters Patent, is—

A pruning implement consisting of a blade having a shank with a hook at the outer end, and a finger projecting from the front of the blade below the hook and in substantially the same plane as the latter, said blade forming, with the hook, a tapering V-shaped throat, and the inner edge of the hook and outer edge of the finger being sharpened so as to form cutting-edges, all substantially as specified.

In testimony whereof I have signed my name to this specification in the presence of two subscribing witnesses.

JOSEPH N. PARKER.

Witnesses:
WILLIAM D. CONNER,
HARRY SMITH.